US008700457B2

(12) United States Patent
Craft (10) Patent No.: US 8,700,457 B2
(45) Date of Patent: Apr. 15, 2014

(54) MOBILE PHONE BASED REBATE DEVICE FOR REDEMPTION AT A POINT OF SALE TERMINAL

(75) Inventor: Michael Craft, Carlsbad, CA (US)

(73) Assignee: William H. Bollman, Washington, DC (US)

( * ) Notice: Subject to any disclaimer, the term of this patent is extended or adjusted under 35 U.S.C. 154(b) by 1389 days.

(21) Appl. No.: 12/003,927

(22) Filed: Jan. 3, 2008

(65) Prior Publication Data

US 2008/0255942 A1  Oct. 16, 2008

Related U.S. Application Data

(60) Provisional application No. 60/878,094, filed on Jan. 3, 2007.

(51) Int. Cl.
*G06Q 30/00* (2012.01)
(52) U.S. Cl.
USPC .................. 705/14.25; 705/14.34; 705/14.38; 705/14.39
(58) Field of Classification Search
USPC ......... 705/14.24, 14.34, 14.36, 14.38, 27, 14, 705/14.1, 14.26, 14.39, 26, 14.25; 455/414.1, 414.3
See application file for complete search history.

(56) References Cited

U.S. PATENT DOCUMENTS

| 7,096,205 | B2* | 8/2006 | Hansen et al. | 705/74 |
|---|---|---|---|---|
| 7,487,262 | B2* | 2/2009 | Cardina et al. | 709/246 |
| 7,609,650 | B2* | 10/2009 | Roskowski et al. | 370/252 |
| 7,870,021 | B2* | 1/2011 | Mankoff | 705/14.17 |
| 8,611,867 | B2* | 12/2013 | Swanburg et al. | 455/414.1 |
| 2002/0091569 | A1* | 7/2002 | Kitaura et al. | 705/14 |
| 2003/0233276 | A1* | 12/2003 | Pearlman et al. | 705/14 |
| 2004/0158492 | A1* | 8/2004 | Lopez et al. | 705/14 |
| 2004/0186770 | A1* | 9/2004 | Pettit et al. | 705/14 |
| 2005/0010533 | A1* | 1/2005 | Cooper | 705/64 |
| 2005/0131761 | A1* | 6/2005 | Trika et al. | 705/14 |
| 2005/0251456 | A1* | 11/2005 | Perkowski | 705/26 |
| 2006/0015404 | A1* | 1/2006 | Tran | 705/14 |
| 2006/0270478 | A1* | 11/2006 | Barhydt et al. | 463/41 |
| 2007/0000997 | A1* | 1/2007 | Lambert et al. | 235/380 |
| 2007/0138270 | A1* | 6/2007 | Reblin | 235/383 |
| 2008/0059285 | A1 | 3/2008 | Hamoui | |
| 2008/0059300 | A1 | 3/2008 | Hamoui | |
| 2009/0281849 | A1 | 11/2009 | Choi | |

OTHER PUBLICATIONS

Henryk Plotz, Martin Stigge, Wolf Muller, and Jens-Peter Redlich; Humbolt University Berlin Computer Science Department Systems Architecture Group; "Self-Replication in J2ME Midlets"; HU Berlin Public Report SAR-PR-2006-04; Mar. 2006; pp. 1-13.*

Krejlgaard, Chris; "Card store diversifies product line to keep up with changes in the market"; Northern Ontario Business; Feb. 1992; pp. 1-3.*

(Continued)

*Primary Examiner* — Ella Colbert
(74) *Attorney, Agent, or Firm* — William H. Bollman (57) ABSTRACT

Virtual mobile rewards, gift cards, and/or physical world retailers' loyalty and reward programs are aggregated into a common account accessible and transactional from an Internet capable mobile radio device. Subscribers gain access to discounted codes, coupons, rebates, gift cards, and/or limited time offers, on their mobile device for food, travel, lifestyle, electronics, and entertainment products that fit their lifestyle spending habits, enabling users to edit participating retailers, manage separate account balances, and present preferred discounted offers at retailers and apply discount towards purchase of goods.

16 Claims, 6 Drawing Sheets

(56) References Cited

OTHER PUBLICATIONS

Gavin Clarke in Las Vegas; The A Register; "Qualcomm beckons developers with BREW Forgotten, not gone"; Apr. 6, 2006; pp. 1-2.*

Andre N. Klingsheim; :J2ME Bluetooth Programming; Department of Informatics University of Bergen; Jun. 30, 2004; pp. 1-183.*

* cited by examiner

———— CONTINUED FROM SHEET 2/6 ————

Registering New Account

Figure 1:
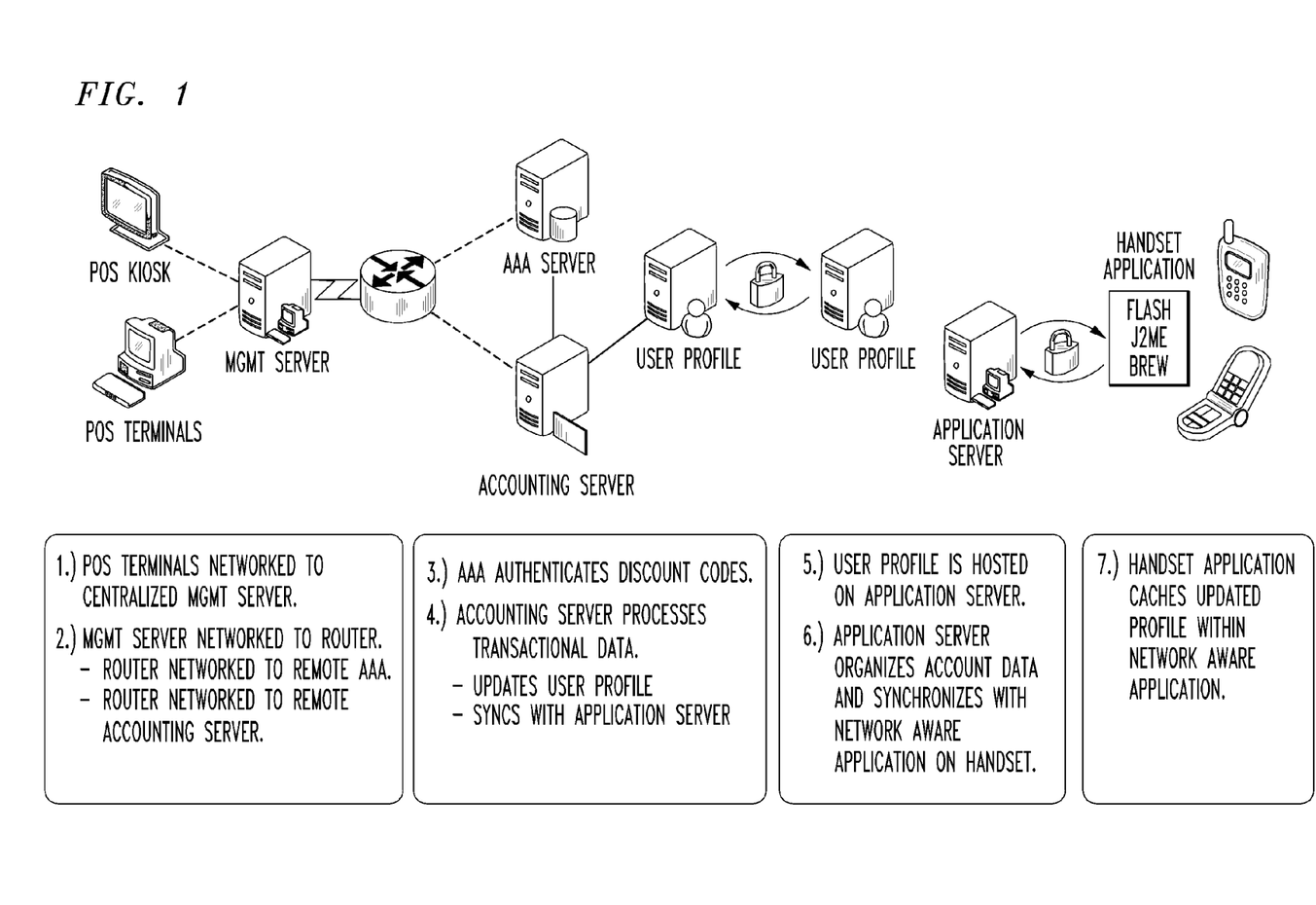
FIG. 1 shows an overview of Stored Account Value Rewards (SAVR) service architecture and platforms according to an embodiment of the invention.
Figure 2A:
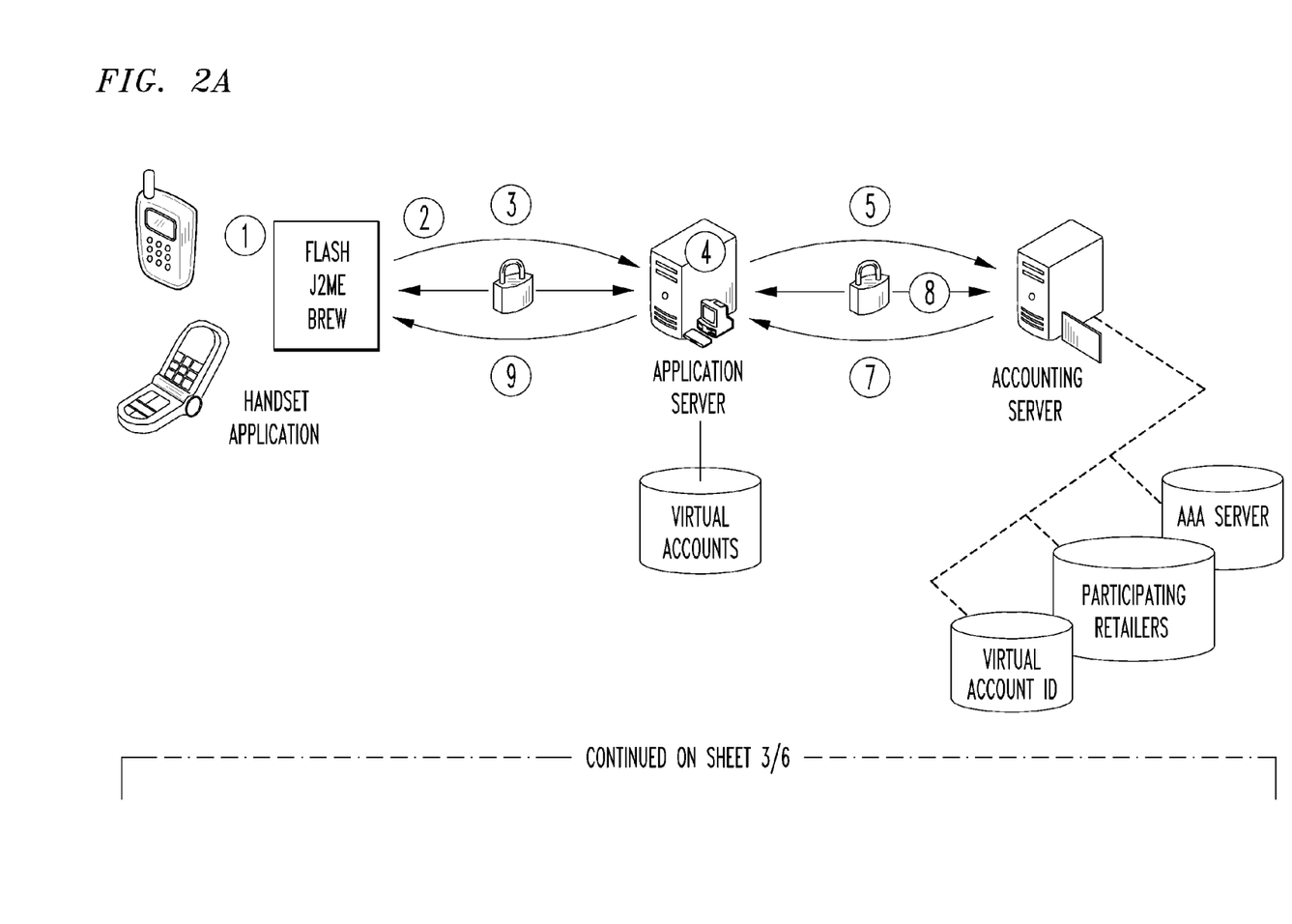
Figure 3A:
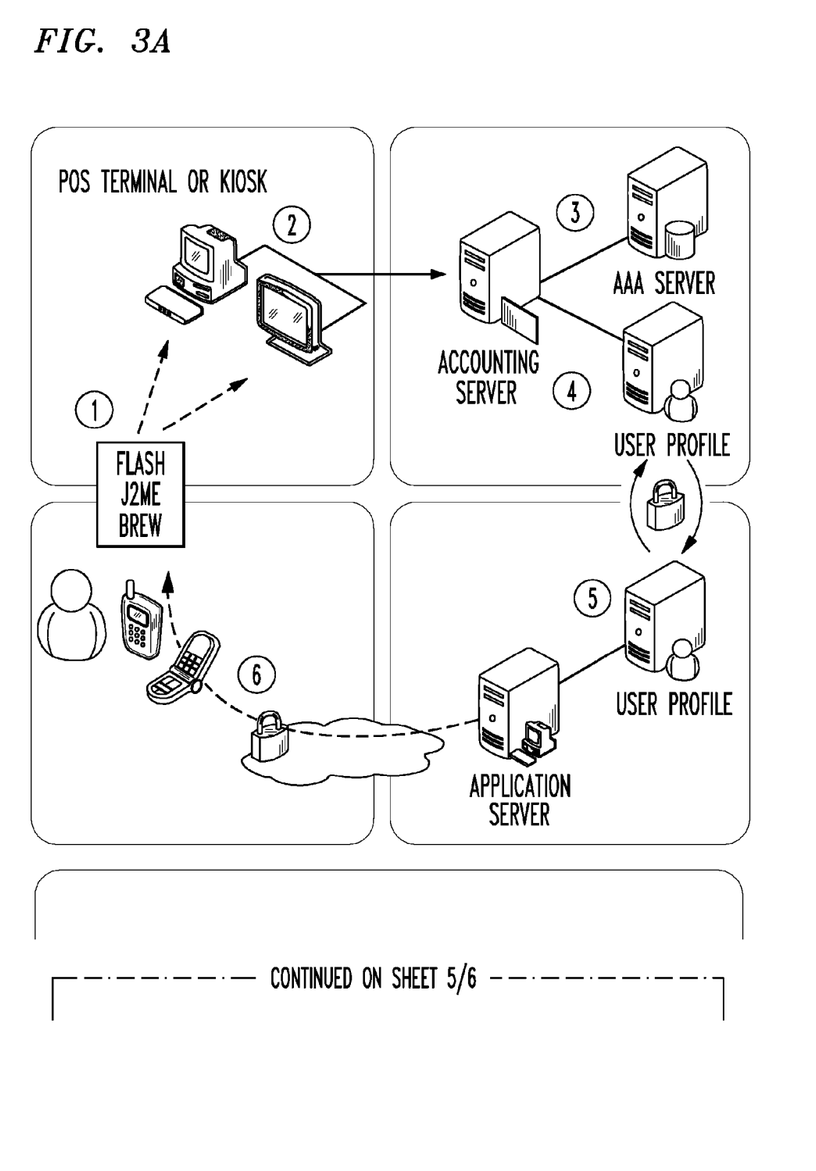
FIGS. 3A and 3B are architecture diagrams showing components of the back end processing systems when transacting a discount code.
Figure 3B:
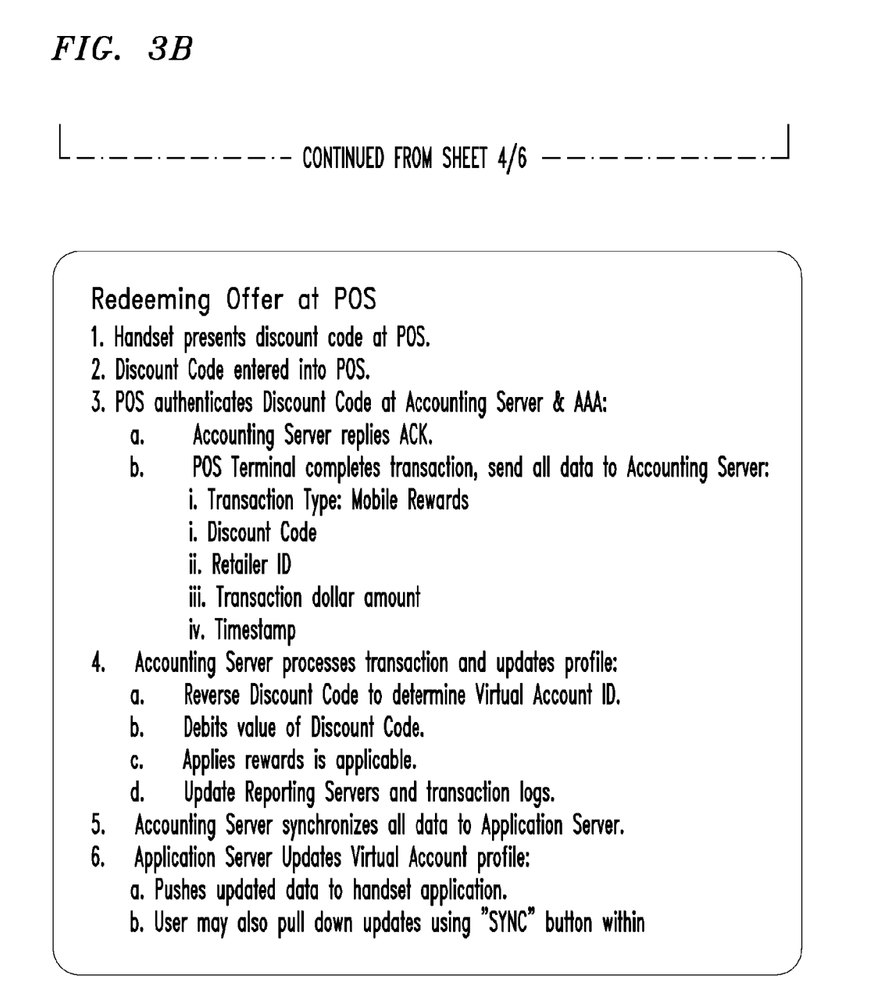

When an account is being assigned for the first time, the downloaded application must establish connectivity with Accounting Server to capture and pass device data. The Application Server pushes data the Accounting server to see if an account exists, and if not, prompts to create new account and Virtual Account ID. A link is established between the Virtual Account on the Application Server, and the Virtual Account ID on the Accounting Server. The Virtual Account ID is a transactional account used solely for financial account mgmt functions. The Accounting Server will push data back to Applications Server so they can be viewed by the device application after transactions, and account updates.

1. User downloads application and registers for new account.
2. User chooses username and/or password, and clicks "Submit".
3. Application sends customer data and device data to Application Server.
4. Application Server receives handset data, MDN/MIN, and users chosen log-in information.
   4.1   Application Server performs profile look up on Accounting Server.
   4.2   If return is negative, then account is created.
5. Application Server sends all account data to Accounting Server.
6. Accounting Server creates new encrypted Virtual Account ID profile:
   6.1.  Create Virtual Account ID based from Virtual Account data
   6.2.  Query and pull from database of latest participating retailers.
   6.3   Uses MDN + Algorithm to create set or starter Discount Codes in account.
7. Accounting Server sends new account ID to Application Server.
8. Application Server Syncs with Accounting Server
9. User views new account with starting balance and offers via device.

⌐ — · — · — — · — CONTINUED FROM SHEET 4/6 — — · — — · — — · ⌐

Figure 4:
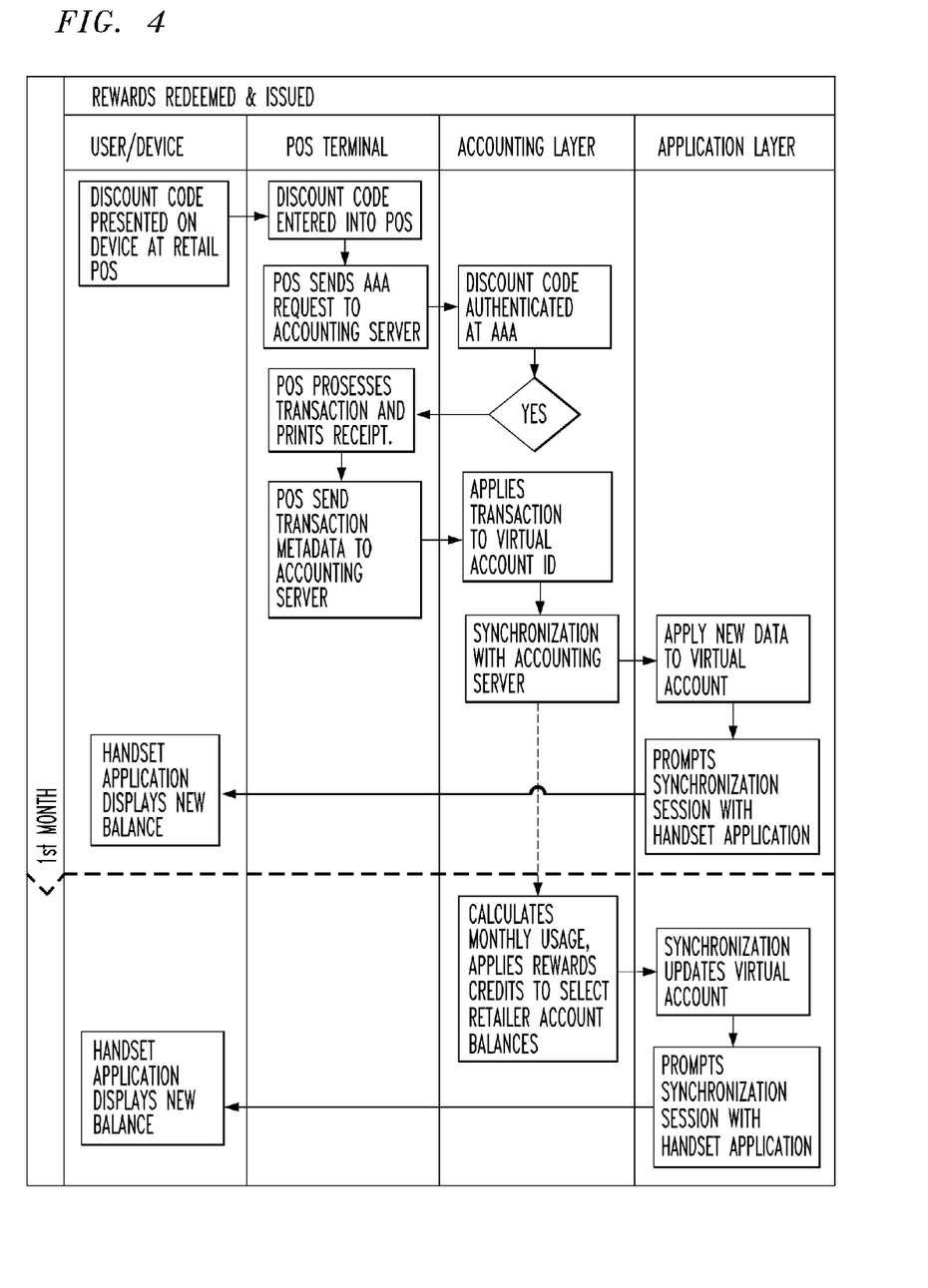
FIG. 4 is a flow diagram showing redemption process and rewards application.

Redeeming Offer at POS
1. Handset presents discount code at POS.
2. Discount Code entered into POS.
3. POS authenticates Discount Code at Accounting Server & AAA:
    a.    Accounting Server replies ACK.
    b.    POS Terminal completes transaction, send all data to Accounting Server:
        i. Transaction Type: Mobile Rewards
        i. Discount Code
        ii. Retailer ID
        iii. Transaction dollar amount
        iv. Timestamp
4. Accounting Server processes transaction and updates profile:
    a.    Reverse Discount Code to determine Virtual Account ID.
    b.    Debits value of Discount Code.
    c.    Applies rewards is applicable.
    d.    Update Reporting Servers and transaction logs.
5. Accounting Server synchronizes all data to Application Server.
6. Application Server Updates Virtual Account profile:
    a. Pushes updated data to handset application.
    b. User may also pull down updates using "SYNC" button within

FIG. 4

MOBILE PHONE BASED REBATE DEVICE FOR REDEMPTION AT A POINT OF SALE TERMINAL

This application claims priority from U.S. Provisional Application No. 60/878,094, filed Jan. 3, 2007, entitled "Mobile Phone Based Rebate and Gift Card Aggregation," which is incorporated herein by reference.

BACKGROUND OF THE INVENTION

1. Field of the Invention

This invention relates generally to rebate reward and/or gift card technologies. More particularly, it relates to user application based services for rebate and gift card technologies.

2. Background of the Related Art

As more retailers add loyalty and reward programs to their customer relationship management (CRM) efforts, capturing the required additional customer data requires lengthy and intrusive questions often leading the consumer to give false information, fearful the information will be sold to third parties. As mobile device saturation reaches peak numbers in the coming years, retailers know an increasing percentage of their customers carry mobile devices, but lack a way to incorporate these devices to build a trusting relationship.

Traditional programs offer discounted offers or coupons from a single source. This system and process lacks scalability, and no way to ingest mobile transactions into a master rewards program, track mobile transaction back to a mobile customer, and show valued customers specialized treatment and added value.

Ultimately, mobile customers need a single trusted service to manage multiple reward programs, and retailers need a marketing channel trusted by their mobile device customers and visibility to who is redeeming their loyalty points on a regular basis.

SUMMARY OF THE INVENTION

In accordance with the principles of the present invention, a method implements a mobile radio based rebate processing reward system. The method receives a rebate transaction identifier assigned to the radio device, the rebate transaction identifier assigned to the rebate request by the point of sale (POS) rebate processing system. The rebate transaction identifier is output to the remote rebate processing center. Status information for the rebate request is retrieved from the rebate processing center. Status information is synchronized with a remote application server for display on mobile radio device.

An interactive radio device-based interface for facilitating rebate processing in accordance with another aspect of the invention includes an interface operable to display a plurality of rebates for interaction by a user to redeem for a product at physical point of sale terminal. Promotion information is received from a centralized processing network, the promotion information comprising a product identifier and a plurality of rebate options for receiving an authorized rebate, at least one of the rebate options having a cash value different than another one of the alternative rebates. Promotion information is communicated to a commercial radio device. A status of the promotion based on purchases of the product is received, the status indicating a number of rebate requests for the promotion and a number of authorized rebates fulfilled for each of the rebate options for the promotion

BRIEF DESCRIPTION OF THE DRAWINGS

Features and advantages of the present invention will become apparent to those skilled in the art from the following description with reference to the drawings, in which:

FIGS. 2A and 2B are diagrams of networked components used to register a new account.

DETAILED DESCRIPTION OF ILLUSTRATIVE EMBODIMENTS

The invention relates to systems and methods for implementing a virtual mobile rewards program designed to aggregate physical world retailers' loyalty and reward programs into a single account accessible and transactional from an Internet capable mobile radio device.

Stored Value Rewards (SVR) is a program that use mobile directory number/mobile identification number/mobile station integrated services digital network (MDN/MIN/MSISDN) to register a virtual mobile rewards account to provide user with $XX in coupons, offers, and limited time deals on food, lifestyle, electronics, and entertainment direct from retailers. The program aggregates 1000+ loyalty programs into a single account accessible and transactionable from the mobile device. Coupon codes, PINs, SKUs, and barcodes are aggregated from multiple programs, recognized by participating POS terminals, stored on a secure server, and accessible from a single binary runtime environment for wireless/ADOBE™ flash multimedia technology/JAVA 2 platform, micro edition (BREW/FLASH/J2ME) application. Accounting checks & balances are managed per transaction by an accounting server, which then exchanges data with the application server, to which the application synchronizes.

In an embodiment: the POS terminal exchanges data and updates a centralized Accounting Server. Accounting Server updates an Application Server storing the Virtual Account. The Virtual Account is accessible and viewable by Mobile Application on device.

Introduction to the Stored Account Value Rewards (SAVR) Program

Point of Sale Systems (POS)—POS terminals accept rebates, personal identification numbers (PINs), stockkeeping units (SKUs), and Barcodes (Discount Codes) in a multiple of different ways, but all forms of discounts and against a transaction resolve to a numerical ID or code that requires authentication. This invention uses the single point of convergence by integrating with the POS backend processing software; thus allowing a single view to the single process in place for updating POS processing systems when new PINs, SKUs, and discount codes are added. Using this process, participating POS terminals will be prepared to recognize and process new PINs and codes that will be recognized as Mobile Transactions and routed to appropriate accounting systems processing, access, authentication, authorization (AAA), and reporting environments.

POS systems and AAA servers are prepared to receive new Discount Codes for this mobile program by updating the scripts containing the algorithm for reversing discount codes to recognize the mobile identifier, and route to the appropriate AAA server. POS terminals will perform standard discount code look-up authentication as it would for any discount or gift card. When discount code is authenticated, the POS determines transaction as mobile transaction. The transaction is processed in its own usual fashion and per the retailers Terms and Conditions, but additionally all transactional data is copied to the centralized Accounting Server.

MDN is Used as Cash Register Locator for Tax Purposes.

Accounting Server—The Accounting Server is a secure centralized server that processes and stores the transactional data for each virtual account ID. This server is networked to all participating POS terminal processing systems, the AAA server, and the Application Server to which the data is synchronized and exported. The Accounting Server hosts, posts, aggregates, and manages the participating loyalty program rules, currencies, and transactional data. For each transaction at retail POS, the Accounting Server processes the transactions against the appropriate loyalty account by crediting or debiting the stored value/balance. The Accounting Server makes account metadata available for additional servers and systems to extract information real time. This server has the following functionalities:

For new accounts, when Accounting Server receives registration data, the Accounting Server creates a session and aggregates all participating retailers and starting balances, creates discount codes specific to the account, then stores them under a Virtual Account ID. Virtual Account IDs are unique identification numbers that will follow users across any mobile phone or device. Each participating retailer within the account is assigned a sub-account ID, which is tied to the Virtual Account ID. Using a series of algorithms, the discount codes resolve back to the Retailer ID, so transactions can be resolved back to the Virtual Account ID. Accounting Server stores new accounts in live environment available for POS terminal processing systems, reporting systems, and application programming interfaces (APIs) for add-on management applications. All IDs are invisible to the user.

Accounting Server activates new account by applying MDN, MIN, and other data passed by the Application Server against an algorithm to create a unique ID for the account called the Virtual Account ID.

Algorithm is applied against MIN/MDN/IMSI/MSISDN to create Virtual Account ID.

Algorithm is applied against Virtual Account ID to create Retail Account IDs for each participating retailers offers within Virtual Account.

Any sub account or loyalty program added later is created against the unique ID.

Algorithm is applied against each Retailer ID to create Discount Codes stored in account.

Algorithm is added to AAA script for reversing and authenticating discount codes for POS.

Accounting server uses discount code to determine Virtual Account ID, enabling all transactional data to be routed to appropriate Virtual account copied to all reporting systems accordingly.

Discount Codes (PINs/SKUs/Barcodes)

Discount codes presented at retail POS must be traceable back to user's Virtual Account for transaction processing, reporting, gifting, rewards, and additional features. Discount codes stay with each retailer sub account allowing the value to be debited like a gift card, and credited for rewards. To achieve this, discount codes are created and assigned when Accounting Server receives initial registration data. Information sent by mobile device is used against an algorithm to create discount codes under each retailer ID. As mentioned above, the reverse algorithm is used against discount codes to determine the Virtual Account ID during a transaction; thus linking the account to the retail transaction, and enabling more data to be captured and with minimal interaction from the customer and cashier.

Application Server—Application Server hosts the environment for the Virtual Account accessed by the application. Although the Accounting Server synchronizes transactional data with the Application server, this environment is kept securely separate for security reasons.

The Application Server is designed to synchronize with multiple external environments to provide a comprehensive Virtual Account that manages different loyalty programs into a single account accessible and transactionable from the mobile device. At this application layer, the virtual account can exchange credit and debit updates with the Accounting Server in real-time, synchronize data with many additional POS terminal aggregators, synchronize profile updates and deltas with device application, and export more robust reporting data than loyalty and reward programs in place today.

Handset Application—The downloadable application serves as the viewer and dashboard to the virtual consolidation of retail reward programs. Once the user downloads and registers, users access and sync with their Virtual Account residing on the Application Server. Registered users have real-time access to participating retailers' discounted offers, and present the offers on their mobile device at retailers' POS terminals. The application manages and displays the correct balance, credits, debits, and point conversions associated with the retailer's loyalty, affinity, and frequent customer reward program.

The network aware application can be in any runtime supporting interactive menu system and a secure network connection including, but not limited to Flash, J2ME, and BREW. The application synchronizes the over a wireless data network, authenticating the user, synchronizes the Application Server to update the account profile on the mobile device.

Registering a Virtual Profile

Users must register within the application to activate a virtual account and profile. Users set up accounts similar to a new Mobile Outlook Express POP3 or Mobile Gmail account except that the post office protocol (POP) & simple mail transfer protocol (STMP) servers are already hardcoded to point to the Application Server. Registration requires the user to provide a username/nickname/password, and can choose the frequency that the account is synchronizes automatically.

Synchronization

Act of synchronizing is similar to ActiveSync or pocket Quicken for personal digital assistants (PDAs). Once the Users login information is authenticated, account data for each participating retailers is updated.

For security reasons the handset only synchronizes with Application layer, and not directly with Accounting layer. To thwart fraud or hacking, the Application Server will have separate authentication and encryption for allowing device access vs. authenticating with Accounting Server. As the number of retailers increases, the application can sync with multiple Applications Servers to update resident account profile.

User Interface

The network aware application is menu driven allowing user to access and edit profile settings, account settings, retailers, and participating retailers. The Interface features a unique interface for easy navigation across multiple retailers, and each retailer's multiple offers.

Customization & Personalization

Not all retailer's offers appeal to all users nor will they match all lifestyle spending habits. users are offered two options to personalize their Virtual Account profile: (a) choose among pre-categorized personas identified by popular mobile industry analysts including but not limited to Road Warrior, Soccer mom, Gadget Geek, and Graduates, or (b) manually delete retailers.

To alleviate risk of users churning due to retail offer overload, using proprietary logic, accounts without usage are deleted and substituted with retailers that relate or match redemption behavior. Additionally, can delete retailers manually, and keep only they offers important to their lifestyle. Additionally, users may add retailers from a networked catalog of participating retailers, including choosing the a line item entry for submitting a program they do not see in the catalog.

Gifting

In the event a customer would like to gift the use of their discount code, the account owner can gift a 1-time use discount code to another mobile device. Transport of the gifted discount code may be short messaging service (SMS), Infrared (IR), Bluetooth, etc. For example, customer chooses to bestow a Starbucks discount upon a friend to help reach the Starbucks monthly spending limits for additional free offers. In this case, the device application will create a 1-time discount code based on the original discount code, and encapsulate the new discount code in an SMS message. In actuality, this 1-time discount code has no limitations regarding transport, only that the discount code be presented at POS terminal. The transaction is accurately recorded against the account holder's transaction log, and displayed in profile. Retailers will now have visibility into the equivalent of customers gifting/sharing use of their gift cards.

While the invention has been described with reference to the exemplary embodiments thereof, those skilled in the art will be able to make various modifications to the described embodiments of the invention without departing from the true spirit and scope of the invention.

What is claimed is:

1. A method of facilitating discount processing with an Internet capable mobile device, comprising:
   obtaining at a physical point of sale (POS) terminal, from a given mobile device, a discount code to redeem for a product or service;
   reversing said discount code to determine a mobile identifier;
   routing a discount authorization request to a centralized processing network application server aggregating retail discounts specifically for said given mobile device;
   in response to said authorization request, communicating authentication for said discount code to said point of sale (POS) terminal; and
   triggering an update to an account for said given mobile device to reflect use of said discount code.

2. The method of facilitating discount processing with an Internet capable mobile device according to claim 1, wherein:
   said given mobile device includes an application comprised of a menu interface to delete, add, or suggest retailer programs from said account of said user of said mobile device, or to choose from pre-bundled personas.

3. The method of facilitating discount processing with an Internet capable mobile device according to claim 2, wherein:
   said application synchronizes with an online database.

4. The method of facilitating discount processing with an Internet capable mobile device according to claim 3, further comprising:
   accepting a gift value into said account for said user of said mobile device.

5. The method of facilitating discount processing with an Internet capable mobile device according to claim 4, wherein:
   said gift value is initiated into said account for said user of said mobile device from a different mobile device.

6. The method of facilitating discount processing with an Internet capable mobile device according to claim 3, further comprising:
   accepting a loyalty reward value into said account for said user of said mobile device.

7. The method of facilitating discount processing with an Internet capable mobile device according to claim 3, wherein:
   said application server synchronizes with multiple external environments to provide a single account for said given mobile device including management of a plurality of different loyalty programs.

8. The method of facilitating discount processing with an Internet capable mobile device according to claim 3, wherein:
   said account for said user of said mobile device includes a plurality of retailer sub accounts.

9. The method of facilitating discount processing with an Internet capable mobile device according to claim 8, wherein:
   said discount code is unique to one of said plurality of retailer sub accounts.

10. Apparatus for facilitating discount processing with an Internet capable mobile device, comprising:
    obtaining at a physical point of sale (POS) terminal, from a given mobile device, a discount code to redeem for a product or service;
    reversing said discount code to determine a mobile identifier;
    routing a discount authorization request to a centralized processing network application server aggregating retail discounts for said given mobile device;
    in response to said authorization request, communicating authentication for said discount code to said point of sale (POS) terminal; and
    triggering an update to an account for said given mobile device to reflect use of said discount code.

11. The method of facilitating discount processing with an Internet capable mobile device according to claim 10, further comprising:
    accepting a gift value into said account for said user of said mobile device.

12. The method of facilitating discount processing with an Internet capable mobile device according to claim 11, wherein:
    said gift value is initiated into said account for said user of said mobile device from a different mobile device.

13. The method of facilitating discount processing with an Internet capable mobile device according to claim 10, further comprising:
    accepting a loyalty reward value into said account for said user of said mobile device.

14. The method of facilitating discount processing with an Internet capable mobile device according to claim 10, wherein:
    said application server synchronizes with multiple external environments to provide a single account for said given mobile device including management of a plurality of different loyalty programs.

15. The method of facilitating discount processing with an Internet capable mobile device according to claim 10, wherein:
    said account for said user of said mobile device includes a plurality of retailer sub accounts.

16. The method of facilitating discount processing with an Internet capable mobile device according to claim 15, wherein:
    said discount code is unique to one of said plurality of retailer sub accounts.

* * * * *